March 31, 1959  J. S. COLES ET AL  2,879,937
OPTICAL DEVICE FOR INTEGRATING FUNCTIONS
Filed March 24, 1950  6 Sheets-Sheet 1

Inventors:
James S. Coles,
Richard M. Brown,
by M. Hayes
Attorney

March 31, 1959 J. S. COLES ET AL 2,879,937
OPTICAL DEVICE FOR INTEGRATING FUNCTIONS
Filed March 24, 1950 6 Sheets-Sheet 3

Inventors:
James S. Coles,
Richard M. Brown,
by M.C. Hayes
Attorney

March 31, 1959 J. S. COLES ET AL 2,879,937
OPTICAL DEVICE FOR INTEGRATING FUNCTIONS
Filed March 24, 1950 6 Sheets-Sheet 4

Inventors:
James S. Coles,
Richard M. Brown,
by M. A. Hayes
Attorney

March 31, 1959　　J. S. COLES ET AL　　2,879,937
OPTICAL DEVICE FOR INTEGRATING FUNCTIONS
Filed March 24, 1950　　6 Sheets-Sheet 5

Inventors:
James S. Coles,
Richard M. Brown,
by
Attorney

March 31, 1959     J. S. COLES ET AL     2,879,937
OPTICAL DEVICE FOR INTEGRATING FUNCTIONS
Filed March 24, 1950                    6 Sheets-Sheet 6

United States Patent Office 2,879,937
Patented Mar. 31, 1959

2,879,937

OPTICAL DEVICE FOR INTEGRATING FUNCTIONS

James S. Coles, Bristol, R.I., and Richard M. Brown, Pullman, Wash., assignors, by mesne assignments, to the United States of America as represented by the Secretary of the Navy Application March 24, 1950, Serial No. 151,768

6 Claims. (Cl. 235—61.6)

This invention relates to integration and integration procedures, and more particularly to an electro-optical mechanical integrator which is useful in the evalution of piezoelectric pressure-time records of underwater explosion phenomena.

By the use of a piezoelectric gauge of well known character, there may be obtained a curve which represents certain characteristics of the shock wave of an underwater explosion. From a curve showing, for example, the relationship between pressure and time at a point underwater in the vicinity of the underwater explosion, it is possible to compute the momentum and the energy of the underwater shock wave, which are important factors in evaluating the effectiveness of the explosive used. The momentum is obtained from $$\int_0^t p\,dt$$

and the energy is obtained from $$\int_0^t p^2\,dt$$

where $p$ is the pressure and $t$ is the time to which it is desired to integrate, taking zero time as the instant of incidence of the shock wave at the particular point in the water.

In principle, the integrator of the invention may be ragarded as a totalizing device which simultaneously sums the values of $p$ and $p^2$ for a number of time intervals across a pressure-time curve of the class described.

It is an object of the present invention to provide a new and improved electro-optical mechanical integrator wherein the light received by a photoelectric cell is regulated in accordance with the magnitude of a condition to be integrated, the summation of photoelectric cell activation indicating the integrated value of the condition.

Another object of this invention is the provision of new and improved interchangeable control means which enable the integration of varied and unusual functions.

Another object is the provision of means for integrating a plurality of functions in one operation.

Another object is the provision of a means arranged to interrupt photoelectric cell activation in accordance wtih the function being integrated, and also to interrupt photoelectric cell activation in accordance with the variations of the magnitude of a condition to be integrated.

Another object of the present invention is the provision of means for setting the integrator at predetermined equally spaced sequential segments of a curve to be integrated, thereby to provide controlled sequential activation of a photoelectric cell and its associated summation device.

Other objects and many of the attendant advantages of this invention will be readily appreciated as the same become better understood by reference to the following detailed description when considered in connection with the accompanying drawings wherein:

Figure 1:
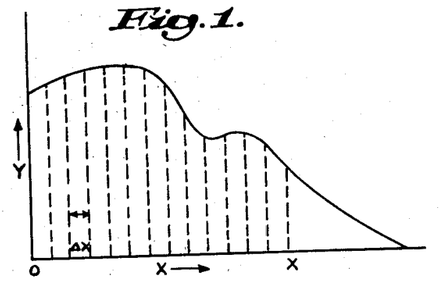
Fig. 1 is a diagrammatic view of the curve to be integrated.

In Fig. 1 we have illustrated a typical pressure-time curve. The integrator of the invention comprises electro-optical mechanical means for evaluating simultaneously the integrals $$\int_0^x y\,dx \text{ and } \int_0^x y^2\,dx$$

from a plot of $y$ as a function of $x$ (Fig. 1).

As noted above, the integrator is a device which totalizes values of the desired function of the variable $y$ for successive increments $\Delta x$ of the independent variable, the process being based on a trapezoidal rule of numerical integration. The desired functional relationship is obtained by the shape of a control member so chosen that it controls the process. Cooperating with the control member is a summation device which causes measurements of a predetermined nature to be recorded in accordance with a definite relation to the control member shape.

Figure 2:
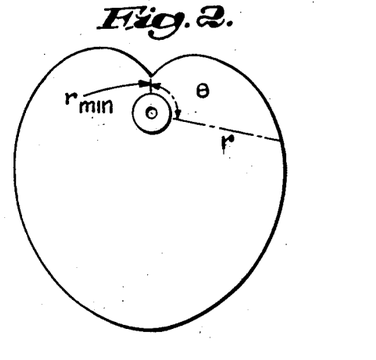
Fig. 2 is a diagrammatic view illustrating a control cam member.
Figure 3:
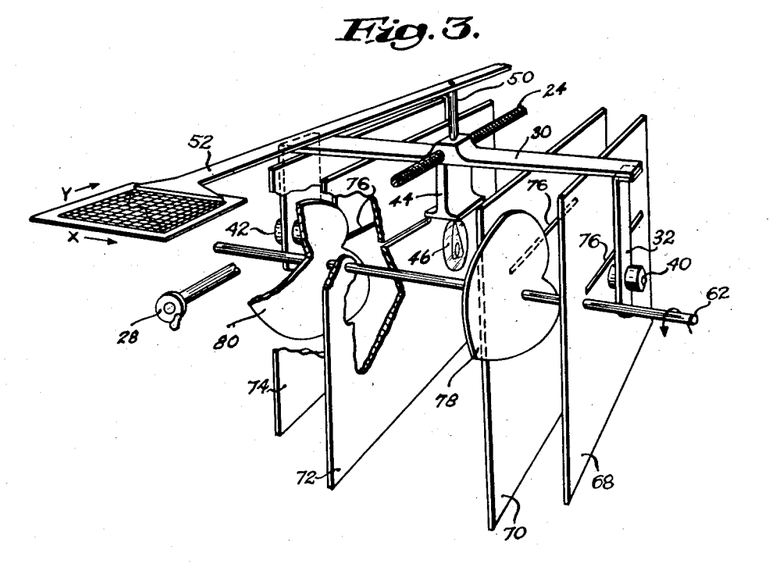
Fig. 3 is a diagrammatic perspective view illustrating control cam members and other mechanical members employed in the integrator of the invention.

For each function which it may be desired to integrate, there is provided a corresponding rotatable control member, the shape of which is chosen to represent a development of the function. For example, in the case of evaluating the integral $\int y\,dx$, the control member is so cut that the radius $r$ is proportional to the absolute value of $\theta$, $1\theta1$, where $\theta$ is the angle subtended by the minimum radius ($r_{min}$) of the control member and the radius $r$ as is indicated in Fig. 2. The equation for the control member, therefore, becomes $r=k1\theta1+r_{min}$.

When an activation device is placed at a distance $r$ from the center of rotation of the control member, the angle through which the control member rotates, while the device is activated, provides a measure of $r$. It will be observed therefore that if the various values of $r-r_{min}$ correspond to the values of $y$ at successive equal segments $\Delta x$, $\Sigma \theta \Delta x$ will be proportional to the area under the curve.

In the evaluation of the integral $\int y^2 dx$, a similar principle applies. The control member is constructed so that $r$ is proportional to $\sqrt{1\theta1}$, where $\theta$ is the angle subtended by $r_{min}$ and the radius $r$. (The equation for the control member is $r=k'\sqrt{1\theta1+r_{min}}$.) In this case, $\theta$ is a measure of $(r-r_{min})^2$, so that when the summation of $\theta$ is made over a number of intervals $\Delta x$, $\Sigma \theta$ will be proportional to $\Sigma(r-r_{min})^2$, and $\Sigma \theta \Delta x$ will be proportional to $\int y^2 dx$.

In accordance with the invention, one suitable integrator consists of an activation device having a photoelectric cell, means for projecting a light beam against the cell and means for positioning the light beam and photoelectric cell; and a control or interrupting device having control members and means for rotating the control members at constant speed, so that the angle $\theta$ through which the control members turn while the cell is activated may be measured in units of time. For each control member there is also provided a summation device consisting of an electric clock which starts when the photoelectric cell is activated and stops when the light beam is cut off by the control member.

These relative movements of the control device and activation device may be carried out in any suitable manner. As an example of one type of mechanical arrangement which has given good results, we have illustrated a structure such as that illustrated in Figs. 3–7 inclusive. In this arrangement, the control members are mounted in a supporting structure. Arranged beside the control members are mounted in a supporting structure. Arranged beside the control members are slotted plates for collimating a beam of light. The photoelectric cell and light beam means are adjustably mounted adjacent to the control members and plate assembly.

Figure 4:
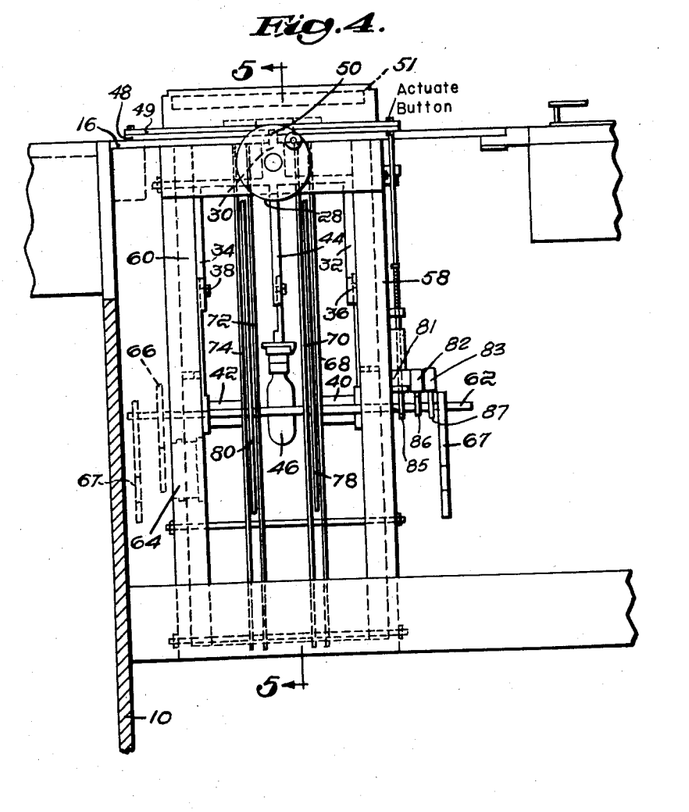
Fig. 4 is a view taken on line 4—4 of Fig. 5.
Figure 5:
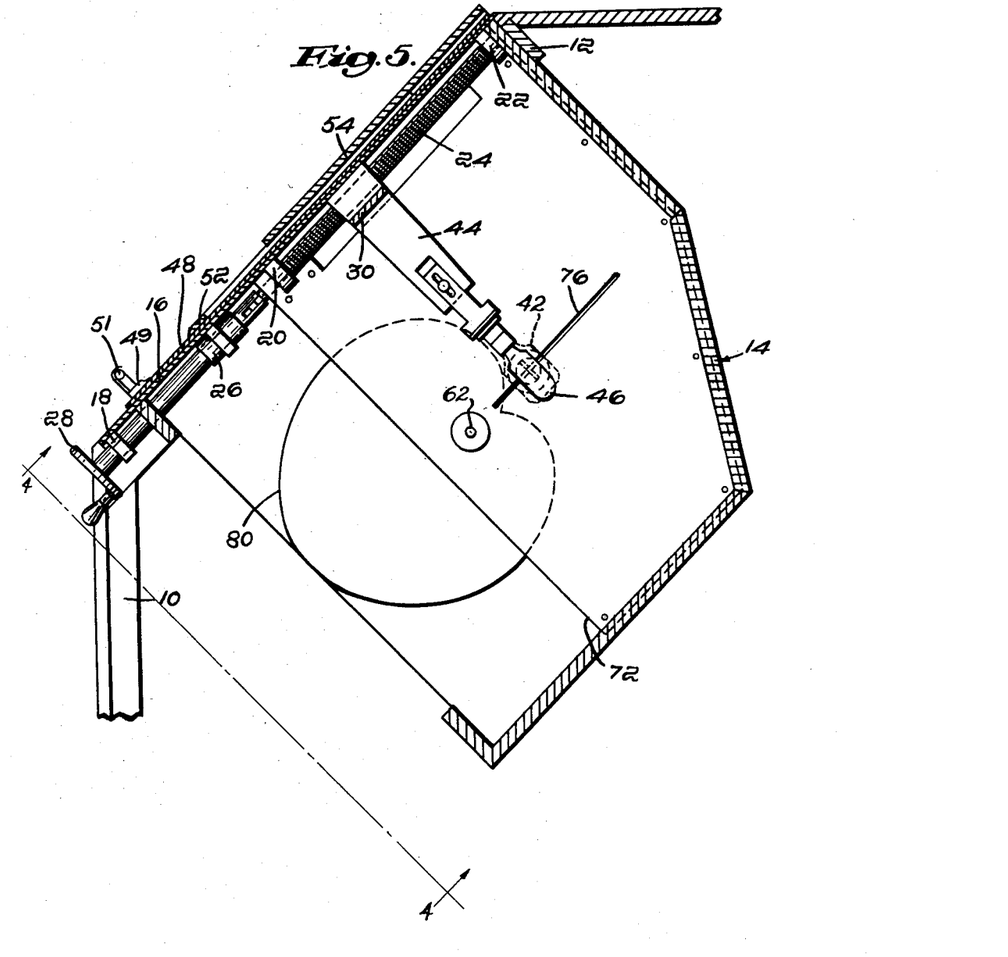
Fig. 5 is a cross section taken on the line 5—5 of Fig. 4.

Considering this structure in detail, the several electrical and mechanical parts of the integrator may be assembled conveniently in a supporting structure in the manner shown in Figs. 4 and 5. A cabinet indicated by reference numeral 14 is supported on uprights 10. Mounted at the top of the cabinet is a base plate 16 which extends beyond a front edge of the cabinet and has suspended from it a bearing member 18. Additional bearings 20 and 22 are arranged in alinement with bearing 18 at the under side of the base plate 16 and support a screw 24 which is connected to one end of a coupling shaft 26. At the other end of the coupling shaft is a hand-operated adjustment disc 28. Threaded on the screw 24, and movable by rotation of the screw, is an elongated support or bracket 30. At either end of the bracket are downwardly extending arms 32 and 34 provided with vertically adjustable means 36 and 38, respectively, to the lower extremities of which two photoelectric cells 40 and 42, respectively, are fixed. A third arm 44 also projecting downwardly from approximately the center of the bracket 30 adjustably supports a light source 46, said light source, in conjunction with cells 40 and 42, constituting an activation means or device.

Figure 6:
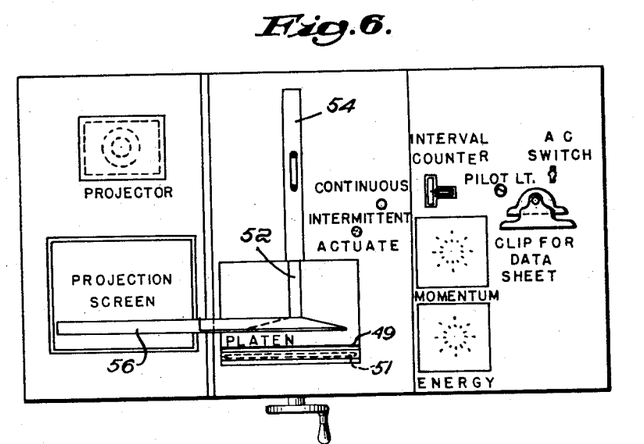
Fig. 6 is a plan view diagrammatically illustrating the control of the integrator.

Mounted on the base plate 16 is a platen 48 and formed in both of these members is a slot through which projects an extension 50 secured to bracket 30 and movable therewith. Fixed to the extension is a setting arm 52 which is in turn slidably received in a recessed guide strip 54 (Fig. 6). Movement of the setting arm relative to the platen is carried out by turning the disc 28 and advancing the bracket along the screw 24. At the front edge of the platen 48, is a zero bar 49 and light 51.

Also secured at the under side of the base plate 16 in spaced-apart relation are two vertical plates 58 and 60. Transversely mounted through bearings in the plates 58 and 60 is a shaft 62 driven by a motor 64 through suitable gearing diagrammatically indicated in the drawings at the point 66. At the ends of the shaft 62 there are provided counter-weight members 67 for balance adjustment, for reasons later made apparent. At either side of the light source 46 are two pairs of spaced-apart shields or shield members 68 and 70; 72 and 74. Numeral 76 denotes slots formed in the shields parallel to each other and to the line of travel of the light source as will be appreciated by inspection of Figs. 3 and 5; the adjustable supports of the light source 46 and the photoelectric cells 40 and 42 providing for planar alignment of the slots, cells and light source. The shaft 62 passes through the shields and has fixed thereon, eccentrically and in spaced relation between each pair of shields, light control members 78 and 80 will have curved edges representing pressure-time relations and control the passage of light between 46 and cells 40 and 42 in accordance with such relations.

The light source 46, together with photoelectric cells 40 and 42, may thus be moved forwardly and rearwardly in parallel relation to the planes of rotation of the light control members 78 and 80. The light source 46 and photoelectric cells 40 and 42 are coupled directly to the setting arm 52 which, by rotation of screw 24, may be placed on a particular mean value of $y$ for a given interval $\Delta x$. It will be noted that for the two light control members, which simultaneously perform $\Sigma y$ and $\Sigma y^2$, there is but one light source and that the two pairs of slotted shields serve to collimate the light in the plane of the motion of the photoelectric cell assembly.

Figure 7:
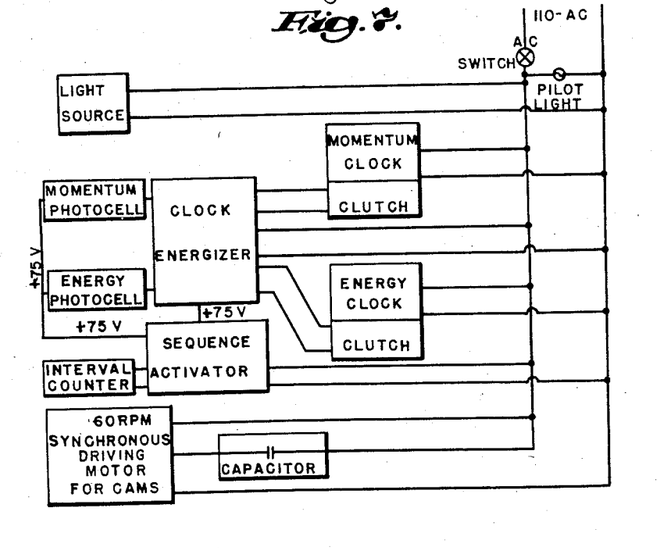
Fig. 7 is a block diagram illustrating electrical apparatus of the invention.

In Fig. 7 we have further illustrated by means of a block diagram the various pieces of electrical equipment having their respective titles including a momentum photoelectric cell, an energy photoelectric cell, a clock energizer, a momentum clock and clutch, an energy clock and clutch, an interval counter, a sequence activator, a synchronous driving motor for cams, a capacitor and a switch.

When the integrator is used, the magnitude of the segment $\Delta x$ is determined by inspection of a given curve. The center of each segment $\Delta x$ is marked. The curve is then placed on the platen 48 and the zero line of the curve alined with the Zero Bar 49 of the integrator, with the control members revolving at constant speed (one rev. per second). The stop clocks and the interval counter are set at zero, with the photoelectric cells 40 and 42 taken out of the clock relay circuit by having their anodes grounded. The operator brings the setting arm 52 to the center of the first $\Delta x$ segment by means of the control screw 24; then he momentarily depresses the "actuate" button noted in Fig. 4 and Fig. 6. This places the solenoid relay circuit of Fig. 8, later described in detail, in its "ready" position so that at the beginning of the next revolution of the light control members, the photoelectric cell anodes are brought to their proper potential and the interval counter registers one count.

When the light control members allow light to impinge on the photoelectric cells, the stop clocks start running and continue until the control members cut off the light beams to the photoelectric cells. At the end of the revolution, the anodes of the photoelectric cells are again grounded, preventing further clock operation. The operator then brings the indicator setting arm to the center of the second $\Delta x$ interval, depresses the "actuate" button, and the operation is repeated. This is continued out to the desired value of $x$.

The product of the reading of each stop clock and the value of $\Delta x$ is proportional to each of the integrals of the function which is being obtained, and the counter indicates the number of segments used in the integration. The clock values may then be translated into absolute values by obtaining the clock readings when the indicator is set on a known value of $y$.

The equation used in evaluating $\int y dx$ is $$\int y dx = nY \Delta x \frac{t_y}{t_Y}$$

where $\Delta x$ is the value of each interval of the independent variable, $Y$ is the calibration setting of the indicator in absolute units of $y$, $t_Y$ is the clock reading when the indicator is set at $Y$ for this equation, $n$ is the number of revolutions during which the clock was activated in determining $t_Y$, and $t_y$ is the clock reading obtained in the integration of the function for this equation.

Similarly, the equation for $\int y^2 dx$ is $$\int y^2 dx = nY^2 \Delta x \frac{t'_y}{t'_Y}$$

where the $n$, $Y$ and $\Delta x$ are as previously defined, and $t'_y$ is the clock reading obtained in the integration, and
$t'_x$ is the clock reading obtained when the indicator is set at Y.

As examples of suitable equipment for carrying out the functions, the cams may be driven at 60 rev./min. by means of a Holtzer-Cabot RWC–2505, 60 rev./min. 110-volt 60-cycle/sec. single-phase synchronous motor. The recording clocks may be Standard Electric Time Company Model S–1 Timers, with clutch coil wound for vacuum-tube operation. The interval counter may be a Veeder Root magnetic counter, Form US for 110-volt A.C. The two photoelectric cells may be RCA type 924 photo-tubes.

Figure 8:
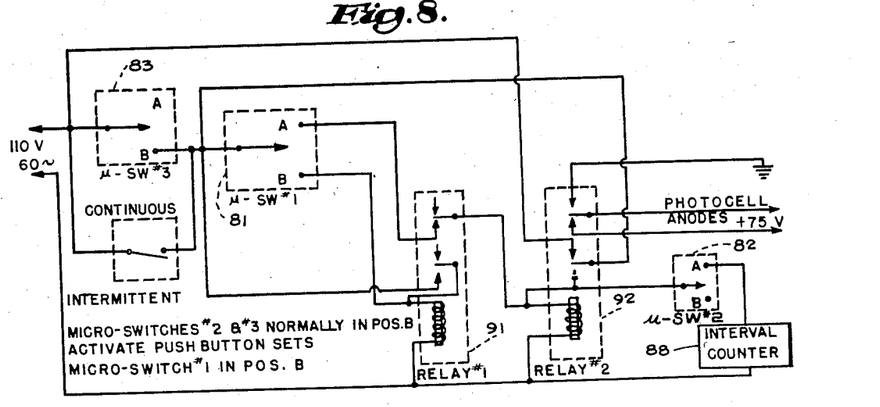
Fig. 8 is a schematic wiring diagram of relay means employed in the integrator.

The sequence activator circuit is shown in Fig. 8. Three microswitches 81, 82 and 83 (Fig. 4), operated by separate control cams 85, 86 and 87, respectively, on the shaft 62, and two double-pole double-throw 110-volt A.-C. relays, are employed. The first microswitch 81, activated by the operator depressing the "actuate" button when ready to measure an interval, applies, in conjunction with solenoid relays 91 and 92 the 75-volt D.-C. voltage to the photoelectric cell anodes at the beginning of the next cycle; the second microswitch 82, activated by the control cam 86 in the middle of the cycle, throws the interval counter 88 which indicates the number of intervals measured; the third, 83, activated by its control cam 87 at the end of the cycle, removes the voltage from the photoelectric cell anodes and grounds them. Microswitch 81 is a maintained-contact switch with a push-button reset; the other two microswitches are momentary-actuated.

The circuit can best be understood from a description of operation during one complete cycle. Depressing the "actuate" button (push-button reset) on microswitch 81, throws this switch into position B, energizing relay 91, which maintains itself by shorting through one of its contacts across microswitch 81. The next time that the light control members pass through their zero positions, microswitch 81 is thrown by its control cam 85 into position A, energizing relay 92. This relay applies the 75-volt D.-C. potential to the photoelectric cell anodes, enabling recording, and also connects the 110-volt A.-C. line to the microswitch 82 and counter mechanism 88 in series. In the middle of the cycle, microswitch 82 is momentarily closed by its control cam 86 and advances the counter mechanism one unit. At the end of the cycle, microswitch 83 is momentarily opened by its control cam 87, removing the 110-volt line from the entire circuit and de-energizing the relays.

When relay 92 is de-energized, one of its contacts shorts out microswitch 83, thus preventing this microswitch from de-energizing relay 91 after it has been set by the actuate button on microswitch 81. Also, when energized, relay 92 maintains itself through one of its contacts, thus preventing a stoppage of operation in mid-cycle through accidental tripping of the "actuate" button.

A single-pole single-throw toggle switch (intermittent-continuous), arranged to short across microswitch 83, prevents the latter from stopping the action at the end of the cycle when desired. This permits rapid consecutive reading when the slope of the curve is not too great, and allows for repeated readings of the same value for increased accuracy during calibration.

Microswitches 82 and 83 may be Microswitch Corporation BZ–RS double-throw S-type spring-plunger microswitches with No. JR type J actuator attachment; microswitch 1 may be a Microswitch Corporation BZ–RSX double-throw S-type spring-throw plunger microswitch (maintained contact with reset button), with No. JR type J actuator attachment. The relays may be Advance Type 1504 double-pole double-throw 110-volt A.-C. relays. The cycle counter may be a Veeder Root magnetic counter, Form US for 110-volt A.-C.

Figure 9:
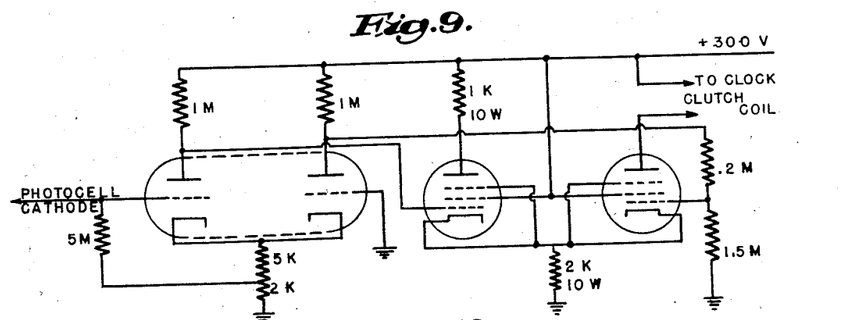
Fig. 9 is another schematic wiring diagram illustrating vacuum tube elements employed.
Figure 10:
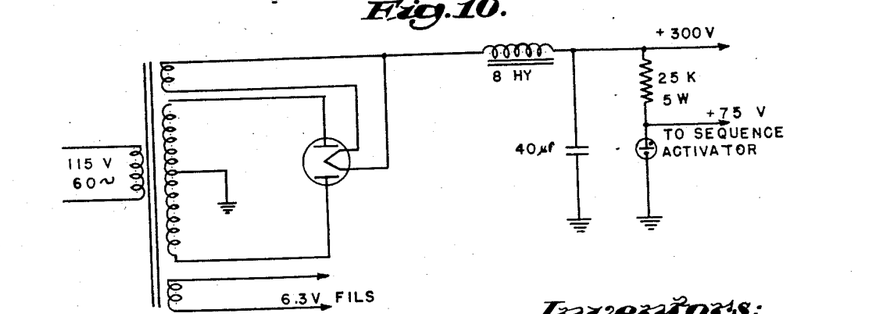
Fig. 10 is still another schematic wiring diagram illustrating power supply means.

The clock energizer circuits are identical for the two channels; the diagram for one of these is shown in Fig. 9.

It consists of two push-pull cathode inverter stages directly coupled. The first stage provides voltage amplification; the second, utilizing 6AG7 tubes, supplies the current to energize the clock clutch coil which forms the plate load of the second 6AG7 tube. Roughly 50 milliamperes are needed for this. The balanced amplification obviates the need for a well-regulated voltage supply, a single section choke input filter supply capable of delivering 7 milliamperes at 300 volts sufficing. For the photoelectric cells, a type VR–75 voltage-regulator tube provides a sufficiently well-regulated voltage source.

The low side of the grid resistor in the input side of the first stage is attached to a variable tap on the cathode resistance of that stage, enabling balance and sensitivity adjustments. It is necessary to shield the leads from the photoelectric cell cathodes to the input grids in order to prevent pickup from stray fields from tripping the clocks.

Figure 11:
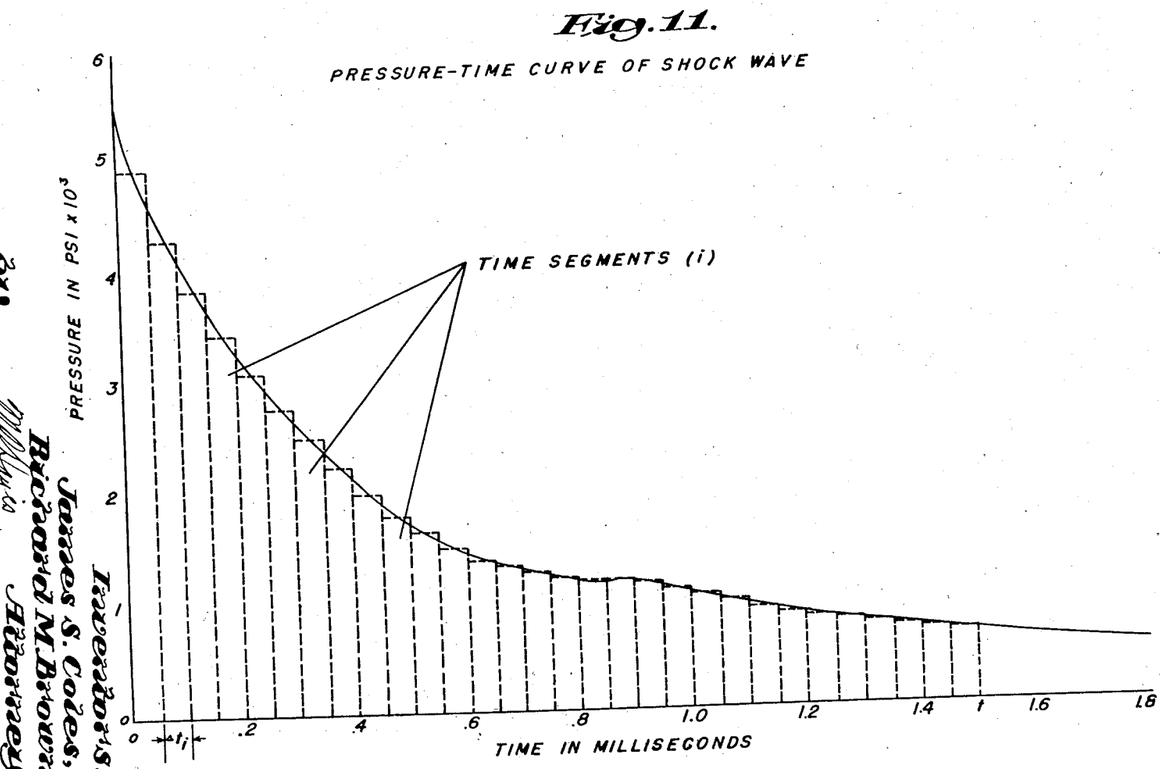
Fig. 11 is a representative pressure-time curve.

Integration of an illustrative curve will now be described in detail. The pressure-time curve, as illustrated in Fig. 11, is divided into equal time segments, the tops of which are approximately bisected by the portion of the curve associated therewith. The curve is placed in position on the platen of the integrator after it has been marked off into time segments along the time axis. After aligning the base line of the curve with the base of the integrator, the setting arm is brought to the point of bisection of the first segment, and the "actuate" button is depressed. The momentum and energy clocks then record respectively the pressure $p$ and the square of the pressure $p^2$ corresponding to the particular setting of the setting arm in momentum clock units and energy clock units, which must be later transformed into absolute units $1p1$ and $1p^21$. The setting arm is then moved to the point of bisection of the next time segment and the "actuate" button again depressed, the momentum and energy clocks adding an amount proportional to $p$ and $p^2$ for the particular setting of the setting arm. This process is repeated for each of the time segments marked off on the pressure-time curve out to time $t$. The readings of the momentum and energy clocks are then noted.

These momentum and energy clock readings are now transformed from clock units into absolute pressure and pressure squared units. This is done by resetting the clocks to zero and placing the setting arm at a value of a known pressure. The "actuate" button is then depressed and the readings of the momentum and energy clocks obtained. From the known values of $p$ and $p^2$ compared with the respective readings of the momentum and energy clocks, it is possible to obtain a calibration factor to change clock units into absolute units. By multiplying the value for the momentum and energy summations noted above by this calibration factor and the value of the time for each segment, the values for momentum and energy factors in absolute units are obtained.

Referring to graph of pressure-time curve illustrated in Fig. 11:

$\Delta ti$ = time included in each time segment.
= 0.05 millisecond.
$t$ = time after the incidence of the shock wave to which momentum and energy factors are evaluated.
= 1.5 milliseconds.
$p$ = pressure at a given time.

$$\text{Momentum factor} = \int_0^t p\,dt \cong \sum_{i=0}^{i=t/\Delta ti} p_i \Delta t_i$$

$$\text{Energy factor} = \int_0^t p^2 dt \cong \sum_{i=0}^{i=t/\Delta ti} p_i^2 \Delta ti$$

*Clock calibration values*

Known pressure setting = $P = 5.1 \times 10^3$ lbs./in.$^2$
$P^2 = 26 \times 10^6$ (lb./in.$^2$)$^2$
Momentum clock reading = $C_p = .598$ clock unit
Energy clock reading = $C_{p2} = .363$ clock unit.

Transformation of momentum and energy factors from clock units to absolute units $$\text{Momentum factor} = \int_0^t p\,dt \simeq P\Delta ti \frac{C_p}{C_p}$$

$$\text{Energy Factor} = \int_0^t p^2 dt \simeq p^2 \Delta ti \frac{C_p{}^2}{C^2{}_p}$$

where $C_p$ = momentum clock summation to time $t = 6.185$ clock units
$C_p{}^2$ = energy clock summation to time $t = 1.900$ clock units
and the other factors are as previously defined.

Substituting the values obtained into these equations gives:
Momentum factor =

$$(5.1 \times 10^3)(.05 \times 10^{-3}) \frac{(6.185)}{.598} = 2.63 \,(\text{lb./in.}^2)\, \text{sec.}$$

$$(26 \times 10^6)(.05 \times 10^{-3}) \frac{(1.900)}{.363} = 6800 \,(\text{lb./in.}^2)^2\, \text{sec.}$$

Although the integrator is currently used for the evaluation of the integrals $\int p\,dt$ and $\int p^2 dt$, under the pressure-time curves obtained from underwater explosions by means of piezoelectric gauges, it may have application in various other fields wherever it is desired to evaluate integrals of the form $\int g(y)dx$ from graphical records of the form $y = f(x)$. Also various modifications of the device may be resorted to. For example, the records of the pressure-time curves may be photographically enlarged on paper, or these records may be only the projected image of the original oscilloscope camera film. Such an arrangement has been diagrammatically indicated at the left-hand side of Fig. 6.

By means of a projector which places an enlarged image of the oscilloscope trace on a screen to one side of the platen on the integrator, it is possible to integrate oscilloscope records directly without making any intervening photographic enlargements or replotting the records. The only additions to the instrument described in the foregoing are a side-arm extension 56 to the setting arm 52, the optical system for projecting the oscilloscope trace, and an adjustable grid perpendicular to the $x$-axis so that the proper intervals of $\Delta x$ may be obtained.

In using this method, the negative is placed on the projector and the grid adjusted by means of the $x$-axis calibration on the negative to give proper intervals of $\Delta x$. After this has been done, the setting arm is brought succesively to each intersection of the experimental trace and the lines of the grid throughout the region being integrated. To calibrate in absolute units, the portion of the negative giving the $y$-axis calibration of the oscilloscope is placed in the projector, the indicator placed on this calibration step, and the same procedure followed as described previously.

Various other changes may be resorted to in making the integrator a more versatile instrument. For example, it can be so designed that the control members are conveniently interchangeable thus allowing large choice in the functions to be integrated. It may also be desired to make the instruments on a large scale with the control members stamped out of Bristol board or a similar substance, and then placed on a small hub which might be conveniently attached to the rotating shaft. For specific and unusual functions, polar-coordinate Bristol board blanks could be suplied with the instrument which would be laid out and cut by hand. It may further be desired to provide control members painted on some transparent substance and then reproduced photographically. Still another arrangement might be an integrator using the principles outlined above wherein the operator merely follows a curve with a pointer. The pointer in this case would activate the recording mechanisms at predetermined intervals of $\Delta x$ and the cam would revolve at sufficient speed so that even though the indicator was moving continuously, error would be small.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. In an electro-optical mechanical integrator, the combination comprising a photoelectric cell, means for projecting a light beam against the cell and activating the same, means fixedly mounting a graph of a particular variable to be integrated, means positionable according to one coordinate of the graph, a rotatable light beam interrupting member disposed between the cell and light beam projecting means and having a periphery of predetermined shape in accordance with a function of a variable to be integrated, means responsive to positioning of said positionable means to position said photoelectric cell and light beam projecting means relative to said member, means for rotating said member at constant speed, and summation means for measuring in units of time the angle through which said member is turned while the photoelectric cell is activated by said light beam.

2. In an electro-optical mechanical device of the character disclosed for integrating a function: activation means comprising a light source and a photoelectric cell disposed within the light range thereof, control means comprising a rotatable light control member arranged intermediate said light source and cell and having a predetermined planar periphery in accordance with a particular function of a variable to be integrated, means for rotating said member at a constant speed so that the area of the member bounded by said periphery selectively interrupts the passage of light to the photoelectric cell during each rotation of the member, means fixedly mounting a graph of the variable to be integrated, means positionable with respect to one coordinate of the graph, means responsive to positioning of said positionable means for positioning said activation means with respect to said control means in accordance with selected magnitudes of the variable to be integrated, and summation means electrically connected to said photoelectric cell and controlled thereby for ascertaining the total time light is received by the photoelectric cell during successive revolutions of said control member.

3. In an electro-optical mechanical device of the character disclosed: positionable activation means comprising a light source and a plurality of photoelectric cells disposed within the light range thereof and activated by light received therefrom, a plurality of control means comprising a rotatable light control member disposed in a plane arranged intermediate said light source and each of the cells, respectively, each member having a predetermined periphery in accordance with a particular function of a variable to be integrated, means for rotating each of said members at a uniform rate to control the ratio of time interval of cell activation with respect to deactivation thereof during each revolution of said member, means for positioning said activation means with respect to said control means in accordance with selected magnitudes of the variable to be integrated, and a plurality of summation means each being individually connected electrically to each of said cells and controlled thereby for ascertaining the total time light is received by each of the cells during successive revolutions of their respective control members.

4. In an integrating apparatus, the combination comprising a supporting structure, a shaft journaled for rotation in said structure, a member fixed to said shaft, a pair of plates with a plate of said pair on each side of said member and adjacent thereto, each plate being provided with an elongated opening therein having a long axis disposed generally in a plane containing the axis of the shaft, a light source and a photoelectric cell in line therewith activated by light from the source, said light source and cell being positionable so that the line between them is always disposed in the aforesaid plane and passes through said openings, said openings serving to collimate the light, said member having a periphery shaped in accordance with a function of a variable to be integrated, rotation of said member varying the amount of collimated light received by the cell according to the position of said light source and cell, said light source and cell being positionable according to selected values of the variable to be integrated, and means for rotating the shaft at a uniform rate.

5. In an integrating apparatus, the combination comprising a supporting structure including two pairs of parallel plates with a space between the pairs, the plates of each pair being closely adjacent each other, a rotatable shaft journaled in the supporting structure and passing through said plates, a pair of planar members disposed so there is a member located between each pair of plates, said members being secured to said shaft and rotatable therewith, said plates having parallel slots formed therein which generally define a plane, a movable elongated bracket carrying a pair of photoelectric cells at its ends and a light source therebetween, said light source being disposed in the space between the pairs of plates with a pair of plates interposed between the light source and each of said cells respectively, said light source and cells being transversely aligned along a line generally disposed in said plane of the slots during movement of the bracket, said slots serving to collimate the light passing from the light source to the cells, said members each having a predetermined peripheral shape in accordance with function of a variable to be integrated, means for moving the bracket to position the light source and cells according to selected magnitudes of the variable, the passage of collimated light being controlled by rotation of said members and in accordance with selected magnitudes of the variable, and means for rotating said shaft at a constant speed.

6. In an electro-optical mechanical integrator, the combination of a supporting structure, an activation means mounted for positioning thereon and comprising a light source and a photoelectric cell linearly aligned with the light source and activated by light therefrom, planar means supporting in a plane a graph of a particular variable to be integrated, means positionable according to one coordinate of the graph, means interconnecting said positionable means and said activating means for positioning the aligned cell and light source in a plane parallel to the plane of the graph in response to positioning of the positionable means, a light control member mounted for rotation on the supporting structure and having a periphery of predetermined shape in accordance with a function of a variable to be integrated, said light control member being so disposed between said light source and said cell that the passage of light from said source to said cell is selectively interrupted during each revolution of the member in accordance with the shape of the member thereby controlling the activation and deactivation of the cell, means for rotating said member at a uniform rate to control the ratio of time interval of cell activation with respect to deactivation thereof during each revolution of said member, and summation means for evaluating the effect of photoelectric cell activation.

References Cited in the file of this patent

UNITED STATES PATENTS

| | | |
|---|---|---|
| 2,184,156 | Bowles | Dec. 19, 1939 |
| 2,277,285 | Woodling | Mar. 24, 1942 |
| 2,356,761 | Jones | Aug. 27, 1944 |
| 2,398,238 | McNatt | Apr. 9, 1946 |
| 2,410,550 | Padva | Nov. 5, 1946 |
| 2,705,901 | Sherwin | Apr. 12, 1955 |